United States Patent
Murdock et al.

[15] 3,693,487
[45] Sept. 26, 1972

[54] VARIABLE LENGTH STAPLE CUTTER

[72] Inventors: Vollie L. Murdock, Rte. 2, Box 189-C; Virgil Leonard, 1914 Cedar Bayou Road; Benjamin M. Holleman, 201 Graham St.; John W. Harding, 4806 St. Andrews, all of Baytown, Tex. 77520

[22] Filed: Nov. 12, 1970

[21] Appl. No.: 89,041

Related U.S. Application Data

[63] Continuation of Ser. No. 750,066, Aug. 5, 1968, abandoned.

[52] U.S. Cl. ............... 83/100, 83/200, 83/262, 83/355, 83/580, 83/913
[51] Int. Cl. ............................................. B65h 29/24
[58] Field of Search........ 83/100, 200, 262, 147, 355, 83/356, 580, 591–596, 913, 236

[56] References Cited

UNITED STATES PATENTS

| | | |
|---|---|---|
| 3,334,533 | 8/1967 | Davis, Jr. ............... 83/355 X |
| 2,580,115 | 12/1951 | McFarland .............. 83/580 X |
| 2,768,689 | 10/1956 | Ewing ..................... 83/596 X |
| 2,768,688 | 10/1956 | Wheeler et al........... 83/913 X |
| 2,846,004 | 8/1958 | Fotland................... 83/591 X |
| 2,217,766 | 10/1940 | Neff......................... 83/913 X |
| 1,764,202 | 6/1930 | Dreyfus ...................... 83/355 |

Primary Examiner—James M. Meister
Attorney—Thomas B. McCullock, Melvin F. Fincke, John B. Davidson, John S. Schneider and Sylvester W. Brock, Jr.

[57] ABSTRACT

The problem of cutting textile filaments into staple while eliminating the fusing of the ends is largely overcome by a variable length staple cutter which feeds the filament through a die into a rotatable cutter wheel having a plurality of openings which are sequentially aligned with the die and form a shear facing with the die. Feed rollers and a vacuum pickup provide for a controlled advance of the fiber through the die to obtain a uniform staple length.

3 Claims, 6 Drawing Figures

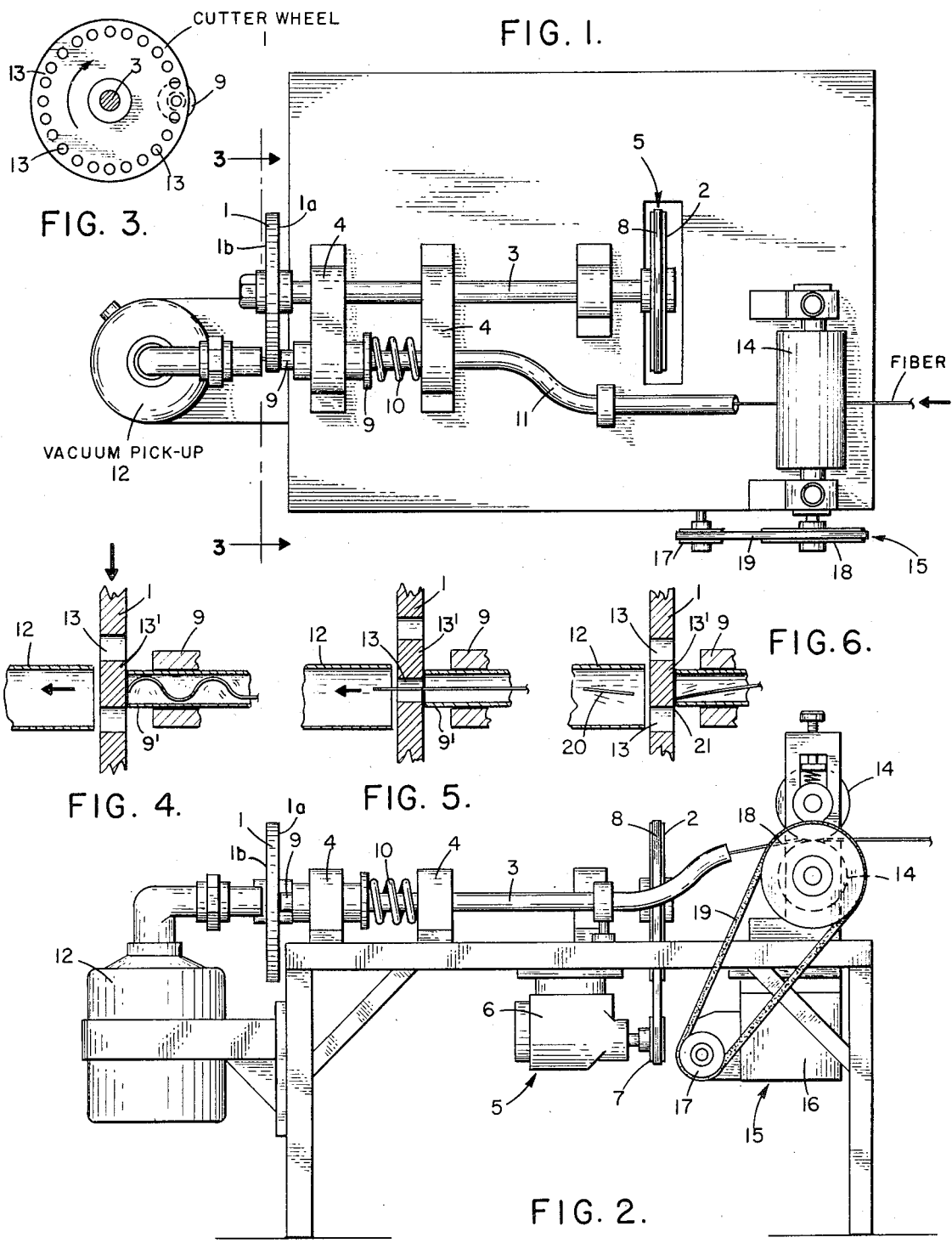

VARIABLE LENGTH STAPLE CUTTER

This application is a continuation of application Ser. No. 750,066, filed Aug. 5, 1968, now abandoned.

BACKGROUND OF THE INVENTION

Textile filaments especially those made from thermoplastic resins have heretofore been cut into staple by the use of knives. The cutting action of a knife passing through the thermoplastic filament has caused the ends to be fused.

The present invention is directed to a variable length staple cutter which allows a uniform preselected length of staple to be produced without fusing the ends of the filaments. The fibers or filaments are cut by a rotatable cutter wheel having a plurality of openings rotating past one or more dies which abut the cutter wheel and are in alignment with the openings forming a shear facing.

SUMMARY OF THE INVENTION

The present invention may be briefly described as a variable length staple cutter which comprises a rotatable cutter wheel having a plurality of openings therein, one or more dies which abut the cutter wheel and are in alignment with the openings to form a shear facing between the cutter wheel and each of the dies, and means for advancing the fiber or filaments through each of the dies. In its more specific aspects, the means for advancing the fiber through a die comprises a vacuum pickup device and a pair of feed rollers which may be controlled as to speed.

BRIEF DESCRIPTION OF THE DRAWINGS

FIG. 1 is a top view of a variable length staple cutter of the preferred embodiment;

FIG. 2 is a side view of the variable length staple cutter;

FIG. 3 is an end cross-section which shows the plurality of openings in the cutter wheel and a die in alignment with the openings; and FIG. 4, 5 and 6 are cross-sections illustrating the cutting action of the rotatable cutter wheel in various positions.

DESCRIPTION OF THE PREFERRED EMBODIMENT

Referring to the drawings, a continuously rotatable cutter wheel 1 having a plurality of spaced apart openings located within the wheel periphery that are radially equidistant from the wheel center is connected to a drive wheel 2 by a shaft 3. Shaft 3 is supported in bearings and supports 4. The drive wheel 2 is driven by a cutter wheel drive 5 which may comprise a motor 6 having a drive wheel 7 connected to the drive wheel 2 by a belt 8. A die 9 having a fiber feed orifice 9' abuts the cutter wheel and is held against the foreface cutter wheel 1 by a spring 10. As seen in FIG. 5, the diameter of the fiber feed orifice 9' is smaller than the land distance 13' separating adjacent openings of the cutter wheel 1, and the openings 13 in the cutter wheel are of smaller diameter than the fiber feed orifice 9'. The spring-loaded die 9 may use the same bearing supports 4 as are used for the shaft 3. Feeding filaments or fibers to the die 9 is a guide tube 11. A vacuum pickup device 12 arranged to exert a vacuum against the backface 1b of cutter wheel 1 draws the filaments through the die and into the openings 13 of the rotatable cutter wheel 1.

The openings 13 in the rotatable cutter wheel are best illustrated in FIG. 3 wherein the openings 13 are shown as circular but may be of any shape and the wheel is rotated so that they are sequentially in alignment with die orifice 9'. As an opening 13 aligns itself with die orifice 9', the vacuum pickup device 12 draws the filament through the opening 13 until the rotation of the cutter wheel 1 cuts the fiber. A uniform staple length may be obtained by having substantially uniformly spaced openings 13 pass in alignment with die orifice 9'. To obtain a desired uniform staple length the fiber is fed to die orifice 9' by passing it through a pair of feed rollers 14. The feed rollers 14 may be spring-loaded and are driven by a roller drive 15 which comprises a variable speed gear motor 16 connected to a drive wheel 17 which is connected to the roller drive wheel 18 on one end of one of the rollers by a belt 19.

The cutting action of the rotatable cutter wheel 1 is more fully illustrated in FIGS. 4, 5 and 6. As illustrated the spring-loaded die 9 abuts the cutter wheel 1. As illustrated in FIG. 4, when none of the openings 13 are in alignment with the fiber feed orifice die 9', the fiber feed rolls 14, being continuously driven at a desired speed, positively feed the fiber into the die orifice die 9'. As an opening 13 in the cutter wheel 1 comes into alignment with the die orifice 9' as illustrated in FIG. 5, a passageway from die orifice 9' through opening 13 to vacuum pickup 12 is formed. The vacuum pickup aspirates through this passageway, and the fiber is drawn through the opening 13 by the vacuum pickup 12. The cutter wheel 1 continues to rotate and cuts the fiber into a staple 20 of a desired length as it passes out of alignment with the die orifice 9' with the staple 20 being picked up by the vacuum pickup 12. The die 9 which abuts the rotatable cutter wheel 1 forms a shear facing 21 which cuts the fiber into the staple of a desired length. The rotatable cutter wheel 1 may be coated with water (not shown) by passing in contact with a sponge or a hose to keep the wheel cool and lubricate the die-cutter wheel interfacing.

The invention will be further illustrated by the following specific examples which are given by way of illustration and not as limitation on the scope of the invention.

EXAMPLE 1

A rotatable cutter wheel having 32 circular openings on a 2-inch radius having a five-sixteenths inch diameter was used to cut 6,800 polypropylene filaments of 6.17 denier per filament for a total of 42,000 denier in one hank. The following results were obtained:

| | | |
|---|---|---|
| Feed Rate for 1 die | 173 ft/min 246 gms/min | 52.7 mtrs/min 32.6 #/hour |
| Cutting Rate for 1 die | —with water lubrication 230 rpm, 32 cuts/rev = 7360 cuts/min/feedhole | |
| Product | ≈ 1/4 inch—calculates to be 0.28 inches or 0.72 cm—the product was easily dispersible into individual pieces of fiber in water containing <.01% Triton x-100 | |

EXAMPLE 2

Using the same rotatable cutter wheel as in Example 1, filaments of 1.4 denier per filament were easily cut into ¼-inch lengths dispersible staple.

A uniformly short staple, especially of small denier, that is dispersible as individual pieces of fiber without being joined together by fused ends is not easily made on available equipment. The staple cutter of the present invention was able to obtain the short length staple even on small denier filament without fused ends at acceptable feed rates.

The nature and objects of the present invention having been completely described and illustrated and the best mode contemplated set forth, what we wish to claim as new and useful and secure by Letters Patent is:

1. A staple cutter for fiber, which comprises:
   a continuously rotatable fore- and back-faced cutter wheel having a plurality of openings separated by lands and located within the periphery of the wheel radially equidistant from the wheel center,
   a die containing a fiber feed orifice and abutting against the foreface of said cutter wheel, the diameter of said fiber feed orifice being smaller than the land distance separating adjacent openings of said wheel and said openings in said wheel being of smaller diameter than said fiber feed orifice, said die being positioned so that said fiber feed orifice is in alignment with said wheel openings as said wheel is rotated, whereby a shear facing is formed between said die and said foreface of said cutter wheel for cutting said fiber to staple,
   means for continuously and positively advancing said fiber through said fiber feed orifice, and
   means connected to a vacuum source and arranged relative to the backface of said cutter wheel for aspiration through said fiber feed orifice when the orifice is in alignment with a wheel opening, and for aspiration exteriorly of said fiber feed orifice on closure of said orifice when a cutter wheel land between adjacent of said openings is opposite said orifice.

2. A staple cutter according to claim 1 wherein said means for continuously advancing the fiber includes a guide tube and a pair of feed rollers.

3. A staple cutter according to claim 1 wherein said feed rollers are driven by a variable speed motor.

* * * * *